(12) United States Patent
Hou et al.

(10) Patent No.: US 8,462,425 B2
(45) Date of Patent: Jun. 11, 2013

(54) OSCILLATOR-AMPLIFIER DRIVE LASER WITH SEED PROTECTION FOR AN EUV LIGHT SOURCE

(75) Inventors: Kai-Chung Hou, San Diego, CA (US); Richard L. Sandstrom, Encinitas, CA (US); William N. Partlo, Poway, CA (US); Daniel J. W. Brown, San Diego, CA (US); Igor V. Fomenkov, San Diego, CA (US)

(73) Assignee: Cymer, Inc., San Diego, CA (US)

(*) Notice: Subject to any disclaimer, the term of this patent is extended or adjusted under 35 U.S.C. 154(b) by 74 days.

(21) Appl. No.: 13/077,757

(22) Filed: Mar. 31, 2011

(65) Prior Publication Data

US 2012/0092746 A1    Apr. 19, 2012

Related U.S. Application Data

(60) Provisional application No. 61/455,289, filed on Oct. 18, 2010.

(51) Int. Cl.

| | |
|---|---|
| *H01S 3/00* | (2006.01) |
| *G02F 1/33* | (2006.01) |
| *G02B 5/22* | (2006.01) |
| *H05G 2/00* | (2006.01) |
| *G06K 7/10* | (2006.01) |

(52) U.S. Cl.
USPC ......... 359/333; 359/305; 359/350; 250/504 R

(58) Field of Classification Search
USPC .................. 250/493.1, 504 R; 359/285, 305, 359/333, 334, 337, 338, 349; 378/119
See application file for complete search history.

(56) References Cited

U.S. PATENT DOCUMENTS

| | | | |
|---|---|---|---|
| 6,549,551 B2 | 4/2003 | Ness et al. | |
| 6,567,450 B2 | 5/2003 | Myers et al. | |
| 6,625,191 B2 | 9/2003 | Knowles et al. | |
| 6,693,939 B2 | 2/2004 | Klene et al. | |
| 6,928,093 B2 | 8/2005 | Webb et al. | |
| 7,087,914 B2 | 8/2006 | Akins et al. | |
| 7,164,144 B2 | 1/2007 | Partlo et al. | |

(Continued)

FOREIGN PATENT DOCUMENTS

WO    2009/0140270    11/2009

OTHER PUBLICATIONS

International Search Report in related PCT/US11/50566, dated Jan. 24, 2012, 2 pages, issued by Lee W. Young, Officer of the International Searching Authority.

(Continued)

*Primary Examiner* — David N Spector
(74) *Attorney, Agent, or Firm* — Cymer, Inc.

(57) ABSTRACT

As disclosed herein, in a first aspect, a device may comprise: an oscillator producing a light output on a beam path; a target material for interaction with light on the beam path at an irradiation site; a beam delay on the beam path the beam delay having a beam folding optical arrangement; and a switch positioned along the beam path and interposed between the oscillator and the beam delay; the switch closable to divert at least a portion of light on the beam path from the beam path, the switch having close time, $t_1$ and the beam path having a length, $L_1$, along the path from the switch to the irradiation site; with $t_1 < cL_1$, where c is the speed of light on the path, to protect the oscillator.

20 Claims, 8 Drawing Sheets

U.S. PATENT DOCUMENTS

| | | | |
|---|---|---|---|
| 7,372,056 B2 | 5/2008 | Bykanov et al. | |
| 7,378,673 B2 | 5/2008 | Bykanov et al. | |
| 7,405,416 B2 | 7/2008 | Algots et al. | |
| 7,415,056 B2 | 8/2008 | Das et al. | |
| 7,439,530 B2 | 10/2008 | Ershov et al. | |
| 7,465,946 B2 | 12/2008 | Bowering et al. | |
| 7,476,886 B2 | 1/2009 | Bykanov et al. | |
| 7,491,954 B2 | 2/2009 | Bykanov et al. | |
| 7,518,787 B2 | 4/2009 | Bykanov et al. | |
| 7,598,509 B2 | 10/2009 | Ershov et al. | |
| 7,671,349 B2 | 3/2010 | Bykanov et al. | |
| 7,843,632 B2 | 11/2010 | Bowering | |
| 7,872,245 B2 | 1/2011 | Vaschenko et al. | |
| 7,897,947 B2 | 3/2011 | Vaschenko | |
| 7,916,388 B2 | 3/2011 | Bykanov | |
| 7,928,416 B2 | 4/2011 | Fomenkov | |
| 8,017,924 B2 | 9/2011 | Bykanov et al. | |
| 2004/0022295 A1 | 2/2004 | Weulersse et al. | |
| 2005/0259709 A1 | 11/2005 | Das et al. | |
| 2006/0255298 A1 | 11/2006 | Bykanov et al. | |
| 2008/0149862 A1* | 6/2008 | Hansson et al. | 250/504 R |
| 2009/0267005 A1* | 10/2009 | Bykanov et al. | 250/504 R |
| 2010/0051831 A1 | 3/2010 | Tao et al. | |
| 2010/0127191 A1* | 5/2010 | Partlo et al. | 250/504 R |
| 2010/0294953 A1 | 11/2010 | Vaschenko et al. | |
| 2011/0140008 A1 | 6/2011 | Bergstedt et al. | |

OTHER PUBLICATIONS

Written Opinion in related PCT/US11/50566, dated Jan. 24, 2012, 7 pages, issued by Lee W. Young, Officer of the International Searching Authority.

U.S. Appl. No. 12/980,939, filed Dec. 29, 2010.

U.S. Appl. No. 61/398,452, filed Jun. 24, 2010.

\* cited by examiner

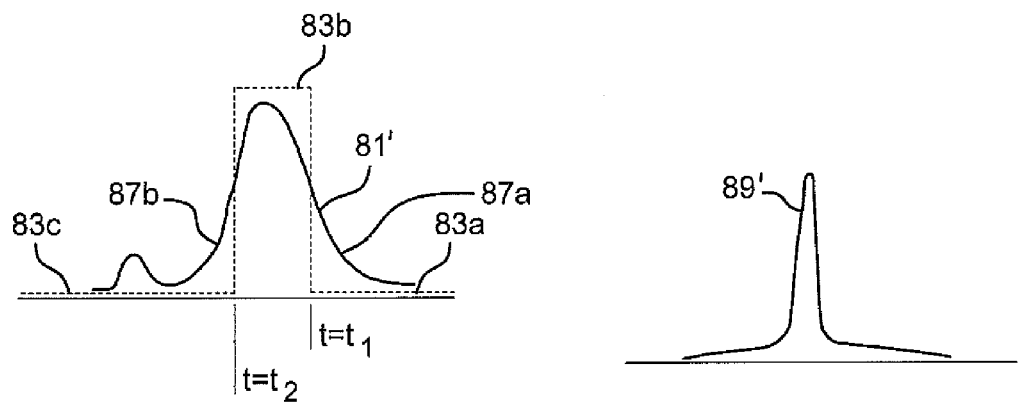
FIG.9B
FIG.9C
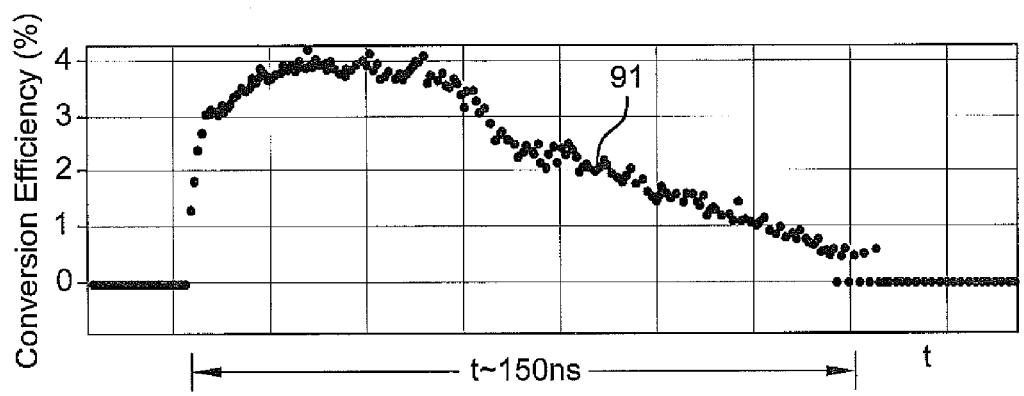
FIG.9D

OSCILLATOR-AMPLIFIER DRIVE LASER WITH SEED PROTECTION FOR AN EUV LIGHT SOURCE

CROSS-REFERENCE TO RELATED APPLICATIONS

The present application claims the benefit of U.S. Provisional Application No. 61/455,289, filed on Oct. 18, 2010 entitled "OSCILLATOR AMPLIFIER DRIVE LASER WITH SEED PROTECTION FOR AN EUV LIGHT SOURCE", the entire contents of which are hereby incorporated by reference.

The present application is also related to U.S. Patent Application Ser. No. 61/398,452, filed on Jun. 24, 2010, entitled MASTER OSCILLATOR-POWER AMPLIFIER DRIVE LASER WITH PRE-PULSE FOR EUV LIGHT SOURCE; U.S. patent application Ser. No. 12/004,905, filed on Dec. 20, 2007, entitled DRIVE LASER FOR EUV LIGHT SOURCE; U.S. patent application Ser. No. 11/786,145 filed on Apr. 10, 2007, entitled LASER PRODUCED PLASMA EUV LIGHT SOURCE; U.S. patent application Ser. No. 11/827,803 filed on Jul. 13, 2007, entitled LASER PRODUCED PLASMA EUV LIGHT SOURCE HAVING A DROPLET STREAM PRODUCED USING A MODULATED DISTURBANCE WAVE; U.S. patent application Ser. No. 11/358,988 filed on Feb. 21, 2006, entitled LASER PRODUCED PLASMA EUV LIGHT SOURCE WITH PRE-PULSE; U.S. patent application Ser. No. 11/067,124 filed on Feb. 25, 2005, entitled METHOD AND APPARATUS FOR EUV PLASMA SOURCE TARGET DELIVERY; U.S. patent application Ser. No. 11/174,443 filed on Jun. 29, 2005, entitled LPP EUV PLASMA SOURCE MATERIAL TARGET DELIVERY SYSTEM; U.S. patent application Ser. No. 11/358,983, filed on Feb. 21, 2006, entitled SOURCE MATERIAL DISPENSER FOR EUV LIGHT SOURCE; U.S. patent application Ser. No. 11/358,992 filed on Feb. 21, 2006, entitled LASER PRODUCED PLASMA EUV LIGHT SOURCE; U.S. patent application Ser. No. 11/174,299 filed on Jun. 29, 2005, entitled, LPP EUV LIGHT SOURCE DRIVE LASER SYSTEM; U.S. patent application Ser. No. 11/406,216 filed on Apr. 17, 2006 entitled ALTERNATIVE FUELS FOR EUV LIGHT SOURCE; U.S. patent application Ser. No. 11/580,414 filed on Oct. 13, 2006 entitled, DRIVE LASER DELIVERY SYSTEMS FOR EUV LIGHT SOURCE; U.S. patent application Ser. No. 11/644,153 filed on Dec. 22, 2006, entitled, LASER PRODUCED PLASMA EUV LIGHT SOURCE; U.S. patent application Ser. No. 11/505,177 filed on Aug. 16, 2006, entitled EUV OPTICS; U.S. patent application Ser. No. 11/452,558 filed on Jun. 14, 2006, entitled DRIVE LASER FOR EUV LIGHT SOURCE; U.S. Pat. No. 6,928,093, issued to Webb, et al., on Aug. 9, 2005, entitled LONG DELAY AND HIGH TIS PULSE STRETCHER; U.S. application Ser. No. 11/394,512, filed on Mar. 31, 2006, entitled CONFOCAL PULSE STRETCHER; U.S. application Ser. No. 11/138,001, filed on May 26, 2005, entitled SYSTEMS AND METHODS FOR IMPLEMENTING AN INTERACTION BETWEEN A LASER SHAPED AS A LINE BEAM AND A FILM DEPOSITED ON A SUBSTRATE; U.S. application Ser. No. 10/141,216, filed on May 7, 2002, now U.S. Pat. No. 6,693,939, entitled, LASER LITHOGRAPHY LIGHT SOURCE WITH BEAM DELIVERY; U.S. Pat. No. 6,625,191, issued to Knowles et al., on Sep. 23, 2003, entitled VERY NARROW BAND, TWO CHAMBER, HIGH REP RATE GAS DISCHARGE LASER SYSTEM; U.S. application Ser. No. 10/012,002; U.S. Pat. No. 6,549,551 issued to Ness, et al., on Apr. 15, 2003, entitled INJECTION SEEDED LASER WITH PRECISE TIMING CONTROL, U.S. application Ser. No. 09/848,043; U.S. Pat. No. 6,567,450 issued to Myers, et al., on May 20, 2003, entitled VERY NARROW BAND, TWO CHAMBER, HIGH REP RATE GAS DISCHARGE LASER SYSTEM, U.S. application Ser. No. 09/943,343; and U.S. patent application Ser. No. 11/509,925 filed on Aug. 25, 2006, entitled SOURCE MATERIAL COLLECTION UNIT FOR A LASER PRODUCED PLASMA EUV LIGHT SOURCE; the entire contents of each of which are hereby incorporated by reference herein.

FIELD

The present application relates to extreme ultraviolet ("EUV") light sources providing EUV light from a plasma created from a source material and collected and directed to an intermediate location for utilization outside of the EUV light source chamber, e.g., for semiconductor integrated circuit manufacturing photolithography e.g., at wavelengths of around 100 nm and below.

BACKGROUND

Extreme ultraviolet ("EUV") light, e.g., electromagnetic radiation having wavelengths of around 5-100 nm or less (also sometimes referred to as soft x-rays), and including light at a wavelength of about 13 nm, can be used in photolithography processes to produce extremely small features in substrates, e.g., silicon wafers.

Methods to produce EUV light include, but are not necessarily limited to, converting a material into a plasma state that has an element, e.g., xenon, lithium or tin, with an emission line in the EUV range. In one such method, often termed laser produced plasma ("LPP"), the required plasma can be produced by irradiating a target material, for example in the form of a droplet, stream or cluster of material, with a laser beam.

Heretofore, LPP systems have been disclosed in which droplets in a droplet stream are irradiated by a separate laser pulse to form a plasma from each droplet. Also, systems have been disclosed in which each droplet is sequentially illuminated by more than one light pulse. In some cases, each droplet may be exposed to a so-called "pre-pulse" to heat, expand, gasify, vaporize, ionize and/or generate a weak plasma and a so-called "main pulse" to convert most or all of the pre-pulse affected material into plasma and thereby produce an EUV light emission.

As indicated above, one technique to produce EUV light involves irradiating a target material. In this regard, $CO_2$ lasers, e.g., outputting light at infra-red wavelengths, e.g. wavelengths in the range of about 9.2 µm to 10.6 µm, may present certain advantages as a drive laser irradiating a target material in an LPP process. This may be especially true for certain target materials, e.g., materials containing tin. For example, one advantage may include the ability to produce a relatively high conversion efficiency between the drive laser input power and the output EUV power.

In some cases, it may be desirable to employ an Oscillator-Amplifier arrangement to produce the relatively high power main pulses used in the LPP process. Generally, for an LPP light source, EUV output power scales with the drive laser power, and, as a consequence, a relatively large amplifier may be employed. For example, in some arrangements, a multi-chamber amplifier having a one-pass small signal gain in the order of $1 \times 10^5$ or more may be seeded with the output of a somewhat fragile oscillator which may include one or more relatively sensitive optics. In fact, for some setups, the amplifier gain is so high that a polarization discriminating optical isolator, which may, for example, stop about 93-99 percent of backpropagating light, may be insufficient to protect the oscillator from damage.

With the above in mind, Applicants disclose an Oscillator-Amplifier Drive Laser with Seed Protection for an EUV Light Source.

SUMMARY

As disclosed herein, in a first aspect, a device may comprise: an oscillator producing a light output on a beam path; a target material for interaction with light on the beam path at an irradiation site; a beam delay on the beam path the beam delay having a beam folding optical arrangement; and a switch positioned along the beam path and interposed between the oscillator and the beam delay; the switch closable to divert at least a portion of light on the beam path from the beam path, the switch having close time, $t_1$ and the beam path having a length, $L_1$, along the path from the switch to the irradiation site; with $t_1 < cL_1$, where c is the speed of light on the path, to protect the oscillator.

In one embodiment of this aspect, the switch may be an acousto-optic modulation (AOM) switch.

In a particular embodiment of this aspect, the device may further comprise an amplifier positioned on the beam path.

In one implementation of this aspect, the device may further comprise an optical isolator positioned on the beam path.

In a particular implementation of this aspect, the optical isolator comprises a polarization discriminating optic and a phase retarding optic.

In one arrangement of this aspect, the switch may have a close time, $t_1$, in the range of 300-500 ns.

In a particular setup of this aspect, the oscillator is a first oscillator generating a main pulse seed output and the device further comprises a second oscillator generating a pre-pulse seed output.

In one embodiment of this aspect, the beam delay may have a length in the range of 80 to 120 meters.

In another aspect, also disclosed herein, a device may comprise: an oscillator producing a light output on a beam path, the oscillator having an output coupler; an amplifier positioned on the beam path; a target material droplet traveling at a speed, v, for interaction with focused light having a beam waist diameter, D, on the beam path at an irradiation site, the droplet having a pre-seed interaction time, T, in the waist, with T=D/2v; a beam delay on the beam path, the beam delay having a beam folding optical arrangement, the beam path having a length, l, along the path from the output coupler to the irradiation site; with 2cl>T, where c is the speed of light on the path, to reduce oscillation between the output coupler and the droplet.

In one embodiment of this aspect, the droplet speed, v, is in the range of 50 to 100 meters per second and the beam waist diameter is in the range of 80 to 120 μm.

In a particular embodiment of this aspect, an optical isolator may be positioned on the beam path.

In a particular implementation of this aspect, the oscillator is a first oscillator generating a pre-pulse seed output and the device further comprises a second oscillator generating a main pulse seed output.

In one implementation of this aspect, the amplifier has a one-pass, main pulse gain in the range of $1 \times 10^5$ to $1 \times 10^7$.

In a particular implementation of this aspect, the beam delay has a length in the range of 60 to 140 meters.

In one implementation of this aspect, the device may further comprise a lens to focus light on the beam path to a waist having beam waist diameter, D.

In another aspect, also disclosed herein, a device may comprise: an optical amplifier, a pre-pulse seed laser, a main pulse seed laser; and a beam combiner for directing the pre-pulse output and the main pulse output on a common beam path through the optical amplifier; a first switch interposed between the pre-pulse seed laser and the beam combiner; and a second switch interposed between the main pulse seed laser and the beam combiner.

In a particular implementation of this aspect, the first and second switches may each comprise an acousto-optic modulation (AOM) switch.

In a particular embodiment of this aspect, an optical isolator may be positioned on the beam path between the optical amplifier and beam combiner.

In one particular embodiment of this aspect, the beam combiner is a partially reflective optic.

In a particular implementation of this aspect, the beam combiner comprises a dichroic beam combiner.

BRIEF DESCRIPTION OF THE DRAWINGS

FIG. 9B shows an intensity-time graph of a pulse entering another pulse shaping unit;

FIG. 9C shows an intensity-time graph of a pulse after pulse shaping as shown in FIG. 9B;

FIG. 9D shows a measured curve of EUV conversion efficiency percent vs. time for an EUV output pulse formed by irradiating a tin droplet with an amplified laser beam seeded with a main pulse having a duration of about 150 ns;

DETAILED DESCRIPTION

Figure 1:
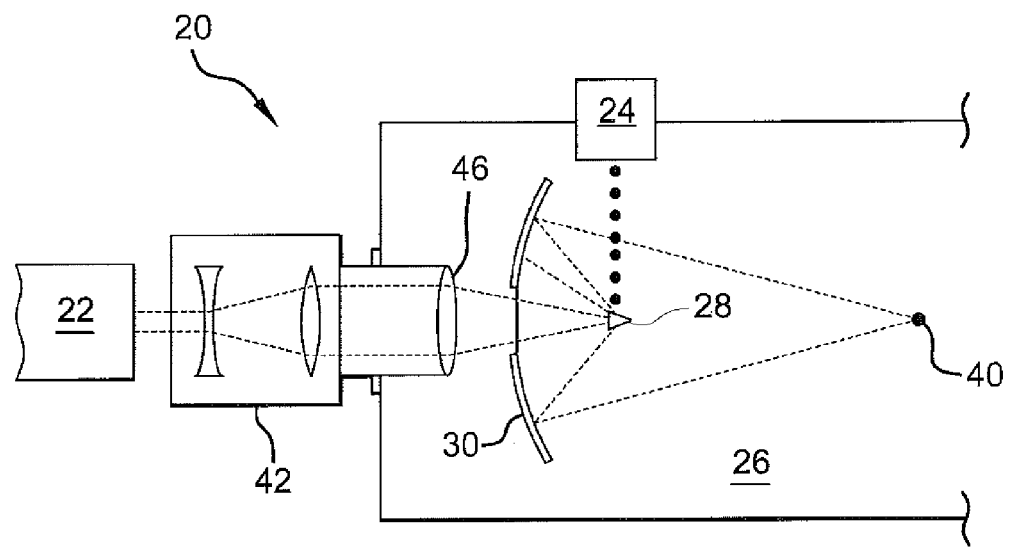
FIG. 1 shows a simplified schematic view of a laser-produced plasma EUV light source according to an aspect of the present disclosure.

With initial reference to FIG. 1, there is shown a simplified, schematic view of an embodiment of an EUV light source, e.g., a laser-produced-plasma EUV light source 20. As shown in FIG. 1, the LPP light source 20 may include a system 22 for generating light and delivering the light into a chamber 26. For the source 20, light may travel along one or more beam paths from the system 22 and into the chamber 26 to illuminate a respective target droplet at an irradiation region 28. Examples of laser arrangements that may be suitable for use in the system 22 shown in FIG. 1 are described in more detail below.

As further shown in FIG. 1, the EUV light source 20 may also include a target material delivery system 24, e.g., delivering droplets of a target material into the interior of a chamber 26 to the irradiation region 28, where the droplets will interact with one or more light pulses, e.g., zero, one or more pre-pulses and thereafter one or more main pulses, to ultimately produce plasma and generate an EUV emission. More details regarding various droplet dispenser configurations and their relative advantages may be found in U.S. patent application Ser. No. 12/721,317, filed on Mar. 10, 2010, entitled LASER PRODUCED PLASMA EUV LIGHT SOURCE; U.S. Ser. No. 12/214,736, filed on Jun. 19, 2008, entitled SYSTEMS AND METHODS FOR TARGET MATERIAL DELIVERY IN A LASER PRODUCED PLASMA EUV LIGHT SOURCE; U.S. patent application Ser. No. 11/827,803, filed on Jul. 13, 2007, entitled LASER PRODUCED PLASMA BUY LIGHT SOURCE HAVING A DROPLET STREAM PRODUCED USING A MODULATED DISTURBANCE WAVE; U.S. patent application Ser. No. 11/358,988, filed on Feb. 21, 2006, entitled LASER PRODUCED PLASMA BUY LIGHT SOURCE WITH PRE-PULSE, and published on Nov. 16, 2006 as US2006/0255298A-1; U.S. patent application Ser. No. 11/067,124, filed on Feb. 25, 2005, entitled METHOD AND APPARATUS FOR EUV PLASMA SOURCE TARGET DELIVERY; now U.S. Pat. No. 7,405,416, issued on Jul. 29, 2008; and U.S. patent application Ser. No. 11/174,443, filed on Jun. 29, 2005, entitled LPP EUV PLASMA SOURCE MATERIAL TARGET DELIVERY SYSTEM, now U.S. Pat. No. 7,372,056, issued on May 13, 2008; the contents of each of which are hereby incorporated by reference.

The target material may include, but is not necessarily limited to, a material that includes tin, lithium, xenon or combinations thereof. The EUV emitting element, e.g., tin, lithium, xenon, etc., may be in the form of liquid droplets and/or solid particles contained within liquid droplets. For example, the element tin may be used as pure tin, as a tin compound, e.g., $SnBr_4$, $SnBr_2$, $SnH_4$, as a tin alloy, e.g., tin-gallium alloys, tin-indium alloys, tin-indium-gallium alloys, or a combination thereof. Depending on the material used, the target material may be presented to the irradiation region 28 at various temperatures including room temperature or near room temperature (e.g., tin alloys, $SnBr_4$), at an elevated temperature, (e.g., pure tin) or at temperatures below room temperature, (e.g., $SnH_4$), and in some cases, can be relatively volatile, e.g., $SnBr_4$. More details concerning the use of these materials in an LPP EUV light source is provided in U.S. patent application Ser. No. 11/406,216, filed on Apr. 17, 2006, entitled ALTERNATIVE FUELS FOR EUV LIGHT SOURCE, now U.S. Pat. No. 7,465,946, issued on Dec. 16, 2008, the contents of which are hereby incorporated by reference herein.

Continuing with FIG. 1, the EUV light source 20 may also include an optic 30 such as a near-normal incidence collector mirror having a reflective surface in the form of a prolate spheroid (i.e., an ellipse rotated about its major axis) having, e.g., a graded multi-layer coating with alternating layers of Molybdenum and Silicon, and in some cases, one or more high temperature diffusion barrier layers, smoothing layers, capping layers and/or etch stop layers. FIG. 1 shows that the optic 30 may be formed with an aperture to allow the light pulses generated by the system 22 to pass through and reach the irradiation region 28. As shown, the optic 30 may be, e.g., a prolate spheroid mirror that has a first focus within or near the irradiation region 28 and a second focus at a so-called intermediate region 40, where the EUV light may be output from the EUV light source 20 and input to a device utilizing EUV light, e.g., an integrated circuit lithography tool (not shown). It is to be appreciated that other optics may be used in place of the prolate spheroid mirror for collecting and directing light to an intermediate location for subsequent delivery to a device utilizing EUV light, for example, the optic may be a parabola rotated about its major axis or may be configured to deliver a beam having a ring-shaped cross-section to an intermediate location, see e.g., U.S. patent application Ser. No. 11/505,177, filed on Aug. 16, 2006, entitled EUV OPTICS, the contents of which are hereby incorporated by reference.

FIG. 1 also shows that the source 20 may include a beam conditioning unit 42 having one or more optics for expanding, steering, pulse shaping and/or shaping the beam between the system 22 and a focusing unit 46. Further details regarding beam conditioning are provided in U.S. patent application Ser. No. 10/803,526, filed on Mar. 17, 2004, entitled A HIGH REPETITION RATE LASER PRODUCED PLASMA EUV LIGHT SOURCE, now U.S. Pat. No. 7,087,914, issued on Aug. 8, 2006; U.S. Ser. No. 10/900,839 filed on Jul. 27, 2004, entitled EUV LIGHT SOURCE, now U.S. Pat. No. 7,164,144, issued on Jan. 16, 2007, and U.S. patent application Ser. No. 12/638,092, filed on Dec. 15, 2009, entitled BEAM TRANSPORT SYSTEM FOR EXTREME ULTRAVIOLET LIGHT SOURCE, the contents of each of which are hereby incorporated by reference.

For the source 22, the focusing unit 46 may include one or more optics for focusing a beam to a focal spot at the irradiation site. For example, the focusing unit may include one or more mirrors, lenses, achromats such as an achromatic doublet or combinations thereof.

As used herein, the term "optic" and its derivatives includes, but is not necessarily limited to, one or more components which reflect and/or transmit and/or operate on incident light and includes, but is not limited to, one or more lenses, windows, filters, wedges, prisms, grisms, gradings, transmission fibers, etalons, diffusers, homogenizers, detectors and other instrument components, apertures, axicons and mirrors including multi-layer mirrors, near-normal incidence mirrors, grazing incidence mirrors, specular reflectors, diffuse reflectors and combinations thereof. Moreover, unless otherwise specified, neither the term "optic" nor its derivatives, as used herein, are meant to be limited to components which operate solely or to advantage within one or more specific wavelength range(s) such as at the EUV output light wavelength, the irradiation laser wavelength, a wavelength suitable for metrology or some other wavelength.

Figure 2A:
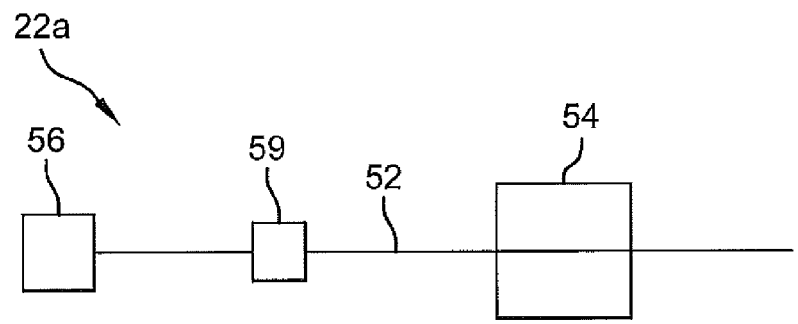
FIG. 2A shows a simplified schematic of an embodiment of a laser source having a seed laser, seed protection unit and common amplifier.

FIG. 2A shows an example of a laser source 22a for use in the light source 20 shown in FIG. 1. As shown in FIG. 22a, the laser source 22a may include a seed laser 56 producing an output that is directed onto a beam path 52 through seed protection unit 59 and amplifier 54.

Figure 2B:
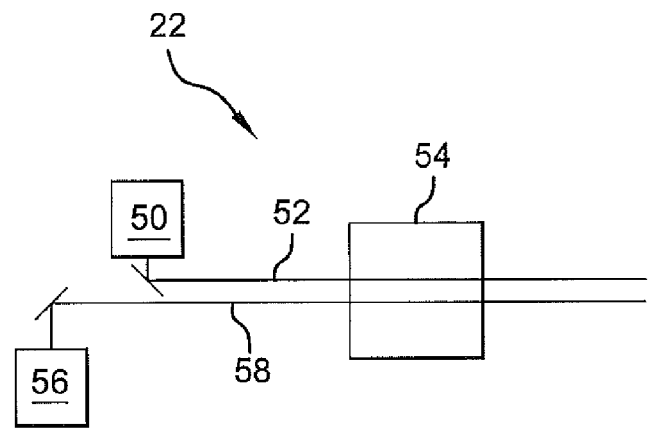
FIG. 2B shows a simplified schematic of another embodiment of a laser source having a pre-pulse seed laser, main pulse seed laser, seed protection unit and common amplifier.

FIG. 2B shows an example of a laser source 22 for use in the light source 20 shown in FIG. 1. As shown in FIG. 2B, the laser source 22 may include a pre-pulse seed laser 50 producing an output that is directed onto a beam path 52 through common amplifier 54 and a main pulse seed laser 56 producing an output that is directed onto a beam path 58 through a seed protection unit 59 and common amplifier 54. It is to be appreciated that a seed protection unit may also be positioned on beam path 52 to protect pre-pulse seed laser 50.

Figure 3:
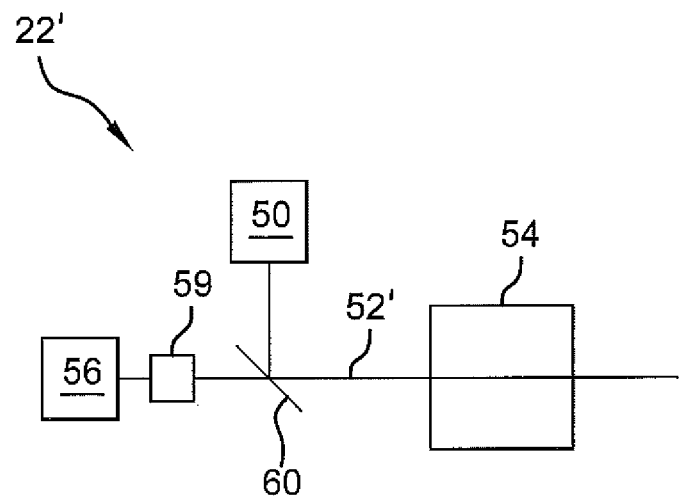
FIG. 3 shows a simplified schematic of another embodiment of a laser source having a pre-pulse seed laser, main pulse seed laser, seed protection unit and common amplifier.

FIG. 3 shows another example of a laser source 22' for use in the light source 20 shown in FIG. 1. As shown in FIG. 3, the laser source 22' may include a pre-pulse seed laser 50 producing an output that is directed onto a common beam path 52' after reflection from optic 60 and through common amplifier 54 and a main pulse seed laser 56 producing an output that is directed through optic 60 onto common beam path 52' and through common amplifier 54. For the arrangement shown in FIG. 3, the optic 60 may be a dichroic beam combiner, polarization discriminating beam combiner prism, volume Bragg grating or partially reflecting beam combiner. It is to be appreciated that the arrangement may be modified such that the pre-pulse seed laser output is transmitted through the optic 60 and the main pulse seed laser output is reflected by the optic 60. It can also be seen in FIG. 3 that a seed protection unit 59 may be positioned on beam path 52' between the main pulse seed laser 56 and optic 60, as shown. Alternatively, or in addition to the seed protection unit 59 shown, a seed protection unit may be positioned between the pre-pulse seed laser 50 and optic 60. It is to be further appreciated that some or all of the seed protection unit(s) may be positioned between the optic 60 and amplifier 54 and that multiple seed protection units may share one, some or all seed protection unit components.

Figure 3A:
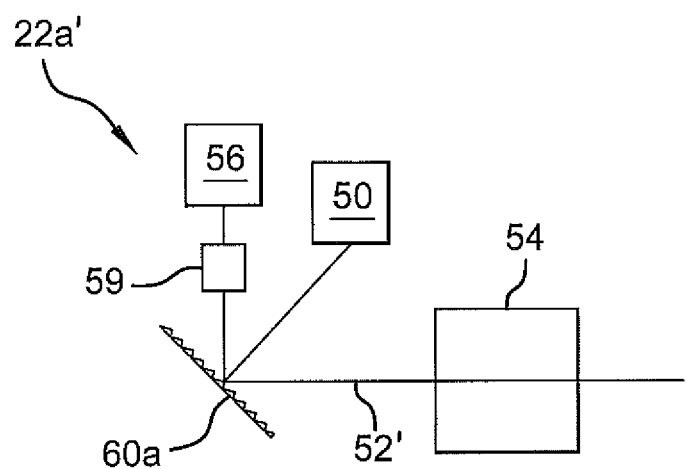
FIG. 3A shows a simplified schematic of another embodiment of a laser source having a pre-pulse seed laser, main pulse seed laser, seed protection unit, common amplifier and a diffraction grating for combining the pre-pulse and main pulse seed laser outputs.

FIG. 3A shows another example of a laser source 22a' for use in the light source 20 shown in FIG. 1. As shown hi FIG. 3A, the laser source 22a' may include a pre-pulse seed laser 50 producing an output that is directed onto a common beam path 52' after diffracting from optic 60a and through common amplifier 54 and a main pulse seed laser 56 producing an output that is diffracted from optic 60a onto common beam path 52' and through common amplifier 54. For the arrangement shown in FIG. 3, the optic 60a may be a diffraction grating. It can also be seen in FIG. 3A that a seed protection unit 59 may be optically positioned between the main pulse seed laser 56 and optic 60a, as shown. Alternatively, or in addition to the seed protection unit 59 shown, a seed protection unit may be positioned between the pre-pulse seed laser 50 and optic 60a. It is to be further appreciated that some or all of the seed protection unit(s) may be positioned between the optic 60 and amplifier 54 and that multiple seed protection units may share one, some or all seed protection unit components.

Figure 4:
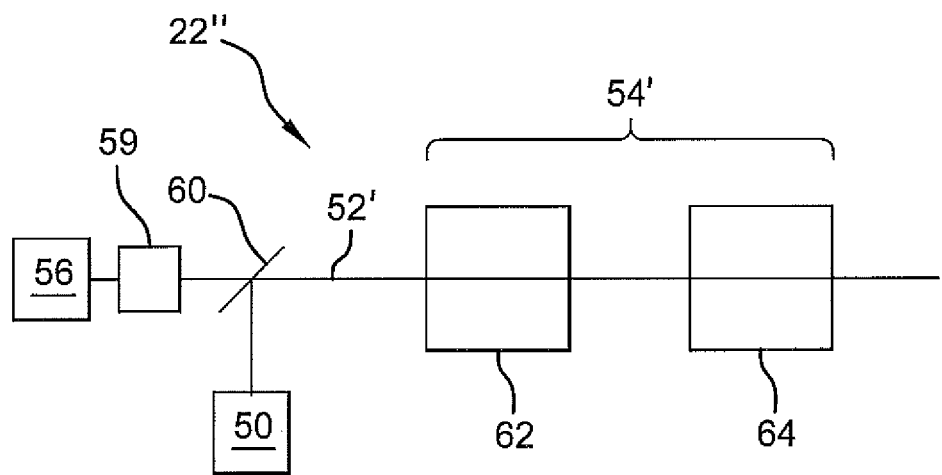
FIG. 4 shows a simplified schematic of another embodiment of a laser source having a pre-pulse seed laser, main pulse seed laser, seed protection unit and common amplifier.

FIG. 4 shows another example of a laser source 22" for use in the light source 20 shown in FIG. 1. As shown in FIG. 4, the laser source 22" may include a pre-pulse seed laser 50 producing an output that is directed onto a common beam path 52' after reflection from optic 60 and through common amplifier 54' and a main pulse seed laser 56 producing an output that is directed through optic 60 onto common beam path 52' and through common amplifier 54'. As further shown, amplifier 54' may have two (or more) amplification units 62, 64, each having a chamber with its own active media and excitation source, e.g. pumping electrodes. For the arrangement shown in FIG. 4, the optic 60 may be a dichroic beam combiner, polarization discriminating beam combiner, partially reflecting beam combiner prism, volume Bragg grating or diffraction grating (see FIG. 3A). It is to be appreciated that the arrangement may be modified such that the pre-pulse seed laser output is transmitted through the optic 60 and the main pulse seed laser output is reflected by the optic 60. It can also be seen in FIG. 4 that a seed protection unit 59 may be positioned on beam path 52' between the main pulse seed laser 56 and optic 60, as shown. Alternatively, or in addition to the seed protection unit 59 shown, a seed protection unit may be positioned between the pre-pulse seed laser 50 and optic 60. It is to be further appreciated that some or all of the seed protection unit(s) may be positioned between the optic 60 and amplifier 54' and that multiple seed protection units may share one, some or all seed protection unit components.

Figure 5:
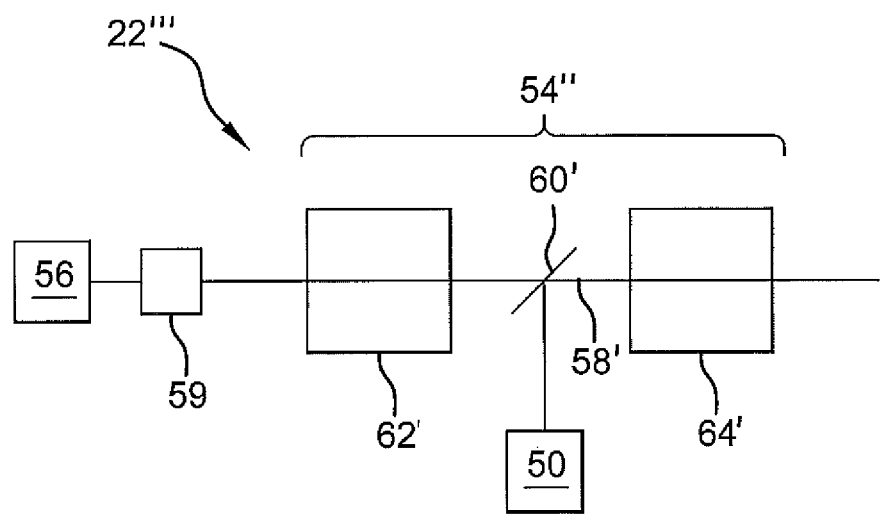
FIG. 5 shows a simplified schematic of another embodiment of a laser source having a pre-pulse seed laser, main pulse seed laser, seed protection unit and common amplifier.

FIG. 5 shows another example of a laser source 22'" for use in the light source 20 shown in FIG. 1. As shown in FIG. 5, the laser source 22'" may include an amplifier 54" with two (or more) amplification units 62', 64', each having its own active media and excitation source, e.g. pumping electrodes. As further shown, a pre-pulse seed laser 50 may be provided producing an output that is directed onto a common beam path 58' after reflection from optic 60' and through common to amplification unit 64'. FIG. 5 also shows that a main pulse seed laser 56 may be provided producing an output that is directed through amplification unit 64' and then through optic 60' onto common beam path 58' and through common amplifier 54". For the arrangement shown in FIG. 3, the optic 60' may be a dichroic beam combiner, polarization discriminating beam combiner prism, volume Bragg grating or partially reflecting beam combiner. It is to be appreciated that the arrangement may be modified such that the pre-pulse seed laser output is transmitted through the optic 60' and the main pulse seed laser output is reflected by the optic 60'. It is to be further appreciated that more than one amplification unit may be positioned between the optic 60' and main pulse seed laser 56 and/or more than one shared amplification unit may be positioned on common beam path 58' to amplify both the pre-pulse seed laser output and the output of the amplification unit 62'. It can also be seen in FIG. 5 that a seed protection unit 59 may be positioned on beam path 58' between the main pulse seed laser 56 and amplifier 62', as shown. Alternatively, or in addition to the seed protection unit 59 shown, a seed protection unit may be positioned between the pre-pulse seed laser 50 and optic 60'.

Figure 6:
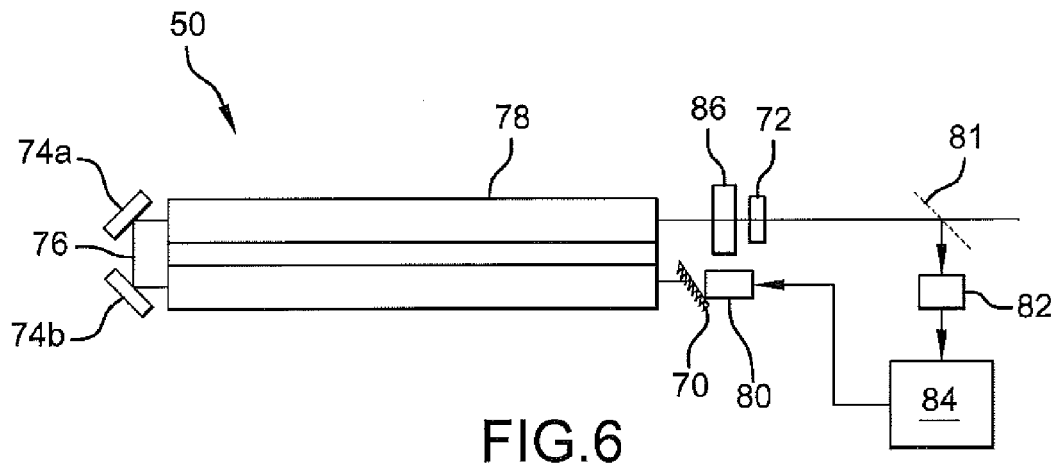
FIG. 6 shows a simplified schematic of an embodiment of a wavelength tunable pre-pulse seed laser.

FIG. 6 shows a simplified schematic of an embodiment of a wavelength tunable pre-pulse seed laser 50 for use in any of the laser sources shown in FIGS. 2-5 and 13-15. As shown, the pre-pulse seed laser 50 may include an optical cavity defined by a grating 70, output coupler 72, mirrors 74a,b and beam path 76. As further shown, beam path 76 may pass through active media 78. For the arrangement, the output coupler may be a partially reflective optic and the grating 70 may be a blazed, eschelle type grating disposed in a Littrow arrangement relative to the incident beam. For the pre-pulse seed laser 50, an actuator 80 may be provided to rotate the grating 70 and change the center wavelength of the pre-pulse seed laser output. For example, the actuator may include a stepper motor, piezoelectric element/stack or a combination stepper motor/piezoelectric. Other actuator designs are possible. It is to be appreciated that other arrangements may be substituted for the grating in Littrow configuration such as a prism/mirror arrangement, an intra-cavity etalon or a grating/mirror combination.

FIG. 6 further shows that an optic 81 such as a partially reflective beam splitter or pickoff mirror may be provided to direct a diagnostic portion of the pre-pulse seed laser output beam to a detector 82. The detector 82 may output a signal indicative of center wavelength to a control circuit 84, which may, in turn, generate a control signal to drive the actuator 80. FIG. 6 further shows that a switch 86 such as an acousto-optic modulation (AOM) switch may be provided to control the quality, Q, of the optical cavity and provide a pulsed laser output at pulse repetition rates in the range of 20-150 khz.

In one setup, the pre-pulse seed laser 50 may be a $CO_2$ laser having a sealed filling gas including $CO_2$ at sub-atmospheric pressure, e.g. 0.05-0.2 atm, that is pumped by a radio-frequency discharge. With this arrangement, the grating may be rotated to tune the pre-pulse seed laser 50 to a selected rotational line.

Figure 7:
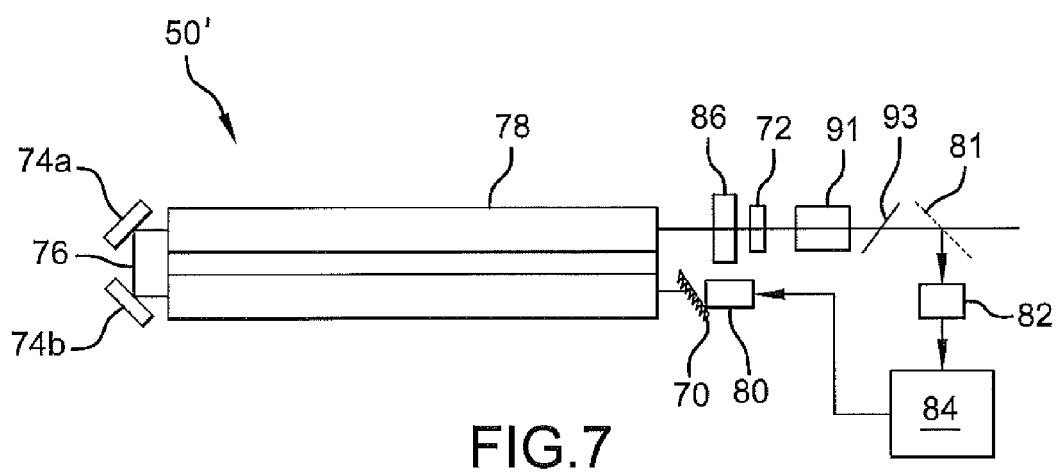
FIG. 7 shows a simplified schematic of an embodiment of a wavelength tunable pre-pulse seed laser having a pulse shaping unit.

FIG. 7 shows a simplified schematic of an embodiment of a wavelength tunable pre-pulse seed laser 50' having a pulse shaping unit for use in any of the laser sources shown in FIGS. 2-5 and 13-15. As shown, the pre-pulse seed laser 50' may include an optical cavity defined by a grating 70, output coupler 72, mirrors 74a,b and beam path 76 (all as described above with reference to FIG. 6). As further shown, beam path 76 may pass through active media 78 and an actuator 80 may be provided to rotate the grating 70, as described above with reference to FIG. 6.

FIG. 7 further shows that an optic 81 such as a partially reflective beam splitter or pickoff mirror may be provided to direct a diagnostic portion of the pre-pulse seed laser output beam to a detector 82. The detector 82 may output a signal indicative of center wavelength to a control circuit 84, which may, in turn, generate a control signal to drive the actuator 80. FIG. 7 further shows that a switch 86 such as an acousto-optic modulation (AOM) switch may be provided to control the quality, Q, of the optical cavity and provide a pulsed laser output at pulse repetition rates in the range of 20-150 khz.

Figure 8:
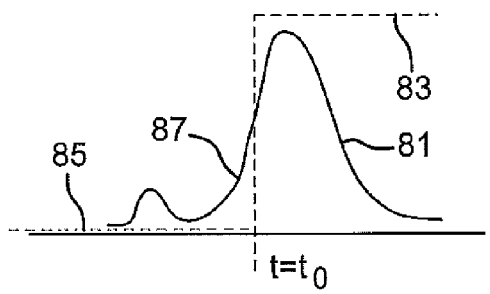
FIG. 8 shows an intensity-time graph of a pulse entering a pulse shaping unit.
Figure 9A:
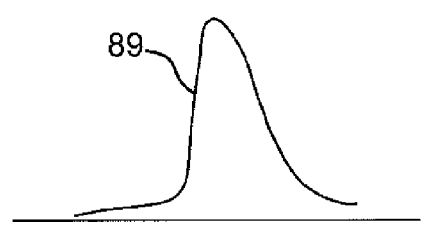
FIG. 9A shows an intensity-time graph of a pulse after pulse shaping as shown in FIG. 8.

The pre-pulse seed laser 50' shown in FIG. 7 may also include a pulse shaping unit operable on the output of the optical cavity. As best seen by cross-referencing FIGS. 7, 8 and 9A, the pulse shaping unit may include a shutter for trimming portion(s) of a pulse 81 that is output by the pre-pulse seed optical cavity. FIG. 8 shows that the shutter may be switched from an open state to a closed state at time $t=t_0$ as indicated by the dashed line showing the shutter open (dash line 83) and closed (dash line 85). As shown, the shutter may be closed to trim a trailing portion 87 of the pulse 81 to produce a trimmed pulse 89 (FIG. 9A) having a shorter pulse duration and a relatively fast fall-time. This shorter pulse duration and relatively fast fall-time may increase EUV output and light source efficiency because of a short interaction time between the pulse and a target, and because unneeded portions of the pulse do not deplete amplifier gain.

Alternatively, or in addition to trimming portion(s) of the pre-pulse, a pulse shaping unit may be used to trim portion(s) of a main pulse, as discussed further below. A common pulse shaping unit, or two different pulse shaping units, may be used to trim pre-pulse and main pulse seeds.

FIG. 9B shows that the shutter may be switched from a closed state to an open state at time $t=t_1$ and thereafter to a closed state at time $t=t_2$ as indicated by the dashed line showing the shutter closed (dash line 83a), open (dash line 83b) and closed (dash line 83c). As shown, the shutter may be closed to trim a leading portion 87a and trailing portion 87b of the pulse 81' to produce a trimmed pulse 89' (FIG. 9C) having a shorter pulse duration and a relatively fast rise time and fall-time. This shorter pulse duration and relatively fast rise-time and fall-time may increase EUV output and light source efficiency because of a short interaction time between the pulse and target, and because unneeded portions of the pulse do not deplete amplifier gain.

In summary, FIGS. 7, 8, 9A-9D illustrate that a leading portion, trailing portion or both may be trimmed from a pre-pulse seed, main pulse seed or both.

For the pre-pulse seed laser 50', one or more polarizers and/or Brewster's windows may be employed such that light exiting the optical cavity has a primary polarization direction. With this arrangement, the shutter may include an electro-optical switch 91, e.g. Pockel's or Kerr cell, and a polarizer 93 such as a thin-film polarizer, having a transmission axis aligned parallel to the primary polarization direction. Thus, when the switch is de-energized, light is able to pass from the output coupler 72 to the optic 81, and, when the switch is energized, light is unable to pass from the output coupler 72 to the optic 81. It is to be appreciated that some or all of the components of the shutter may be positioned downstream of the optic 81.

In one application of the above described arrangement, a pulse output by the pre-pulse seed optical cavity having a full-width-half-maximum (FWHM) pulse duration greater than about 200 ns may be trimmed to produce a pulse having a pulse duration less than about 200 ns (FWHM). In one particular application, a pulse output by the pre-pulse seed optical cavity having a pulse duration of about 500 ns (FWHM) may be trimmed to produce a pulse having a rise-time of about 8 ns and a pulse duration of 30 ns (FWHM).

Figure 10:
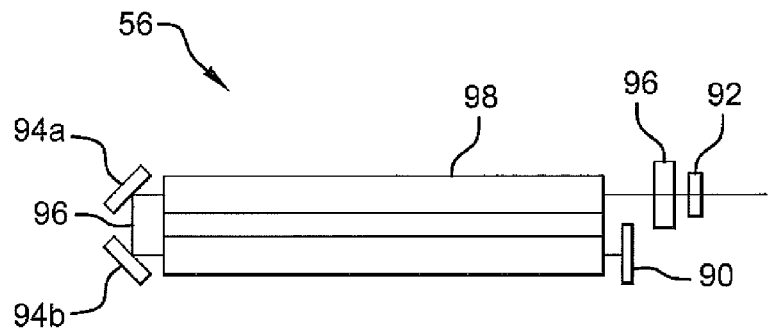
FIG. 10 shows a simplified schematic of an embodiment of a main pulse seed laser.

The tunable seed laser embodiments shown in FIG. 6 or 7 may also be used as the main-pulse seed laser 56 in any of the arrangements shown in FIGS. 2-5 and 11-15 or a more simplified laser embodiment, such as the laser 56, shown in FIG. 10 may be used. As shown there, the main pulse seed laser 56 may include an optical cavity defined by a fully reflective rear mirror 90, output coupler 92, mirrors 94a,b and beam path 96. As further shown, beam path 96 may pass through active media 98. For the arrangement, the output coupler 92 may be a partially reflective optic.

Alternatively, or in addition to using a pulse shaping unit on the pre-pulse seed laser 50' shown in FIG. 7, a pulse shaping unit may be employed on the main pulse seed laser, such as the main pulse seed laser 56 shown in FIG. 10 to trim a main pulse output and produce a main pulse having a relatively fast rise time. In one setup, the main pulse seed laser 56 may be a $CO_2$ laser having a sealed gas including $CO_2$ at sub-atmospheric pressure, e.g. 0.05-0.2 atm, that is pumped by a radio-frequency discharge. With this arrangement, the main pulse seed laser may self-tune to one of the dominant lines such as the 10P(20) line having wavelength 10.5910352 µm. In some instances, an actuator (not shown) may be provided to move the rear mirror 90 to prevent mode-hopping.

In one application of the above-described arrangement, a pulse output by the main-pulse seed optical cavity having a pulse duration greater than about 200 ns (FWHM) may be trimmed to produce a pulse having a pulse duration less than about 200 ns (FWHM). In one particular application, a pulse output by the main pulse seed optical cavity having a pulse duration of about 500 ns (FWHM) may be trimmed to produce a pulse having a pulse duration of about 150 ns (FWHM).

FIG. 9D shows a measured curve 91 of EUV conversion efficiency percent (i.e. the percent of EUV output power to laser output power) vs. time for an EUV output pulse formed by irradiating a tin droplet with an amplified laser beam seeded with a trimmed main pulse having a duration of about 150 ns (FWHM).

Referring back to FIGS. 2-5, it can be seen that each arrangement includes an amplifier 54, 54', 54", having one or more amplification units 54, 62, 64, 62', 64'. For the case where the pre-pulse seed laser 50, 50' and main pulse seed laser 56 include active media including $CO_2$ described above, suitable lasers for use as amplification units 54, 62, 64, 62', 64' may include an active media containing $CO_2$ gas that is pumped by DC or RF excitation. In one particular implementation, the amplifier may include a plurality, such as three or four, axial-flow, RF-pumped (continuous or with pulse modulation) $CO_2$ amplification units having a total gain length of about 16-20 meters, and operating, in concert, at relatively high power, e.g., 20 kW or higher. Other types of amplification units having fiber, rod, slab or disk-shaped active media may be used. In some cases, a solid active media may be employed.

For the laser sources 22, 22', 22a', 22" and 22'" shown in FIGS. 2B, 3, 3A, 4 and 5, the pre-pulse seed output and main pulse seed output may have the same central wavelength or the wavelengths may be different. These wavelengths may be selected to improve pre-pulse to main-pulse seed output contrast ratio, reduce pre-pulse gain depletion and/or to reduce focusing lens chromatic aberration. More details regarding pre-pulse and main pulse wavelength selection can be found in U.S. Patent Application Ser. No. 61/398,452, filed on Jun. 24, 2010, entitled MASTER OSCILLATOR-POWER AMPLIFIER DRIVE LASER WITH PRE-PULSE FOR EUV LIGHT SOURCE, which is hereby incorporated by reference.

Figure 11:
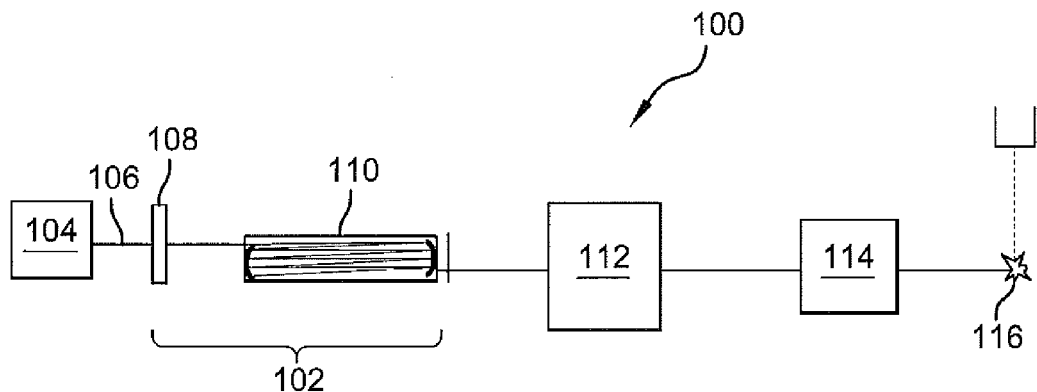
FIG. 11 shows an example of a device having a seed protection unit.

FIG. 11 shows a first example of a device 100 having a seed protection unit 102 in more detail. As seen there, the device 100 may include an oscillator 104, such as the seed laser shown in FIGS. 6, 7, 10 or some other suitable seed laser, producing a light output on beam path 106 which passes through switch 108, beam delay 110, amplifier 112, beam conditioning unit 114 and subsequently interacts with a target material at an irradiation site 116. For the device 100, the amplifier may have one or more amplifying units, each having a sealed gas and excitation source and the beam conditioning and focusing unit 114 may have one or more optics for expanding, steering, pulse shaping, focusing and/or shaping the beam.

For the device 100, the switch 100 may be an acousto-optic modulation switch, sometime referred to as a Raman-Nath (AOM) switch which is reconfigurable between a first, open state which allows light to flow substantially unimpeded through the switch along beam path 106 and a second, closed state which deflects/diffuses a substantial portion of light from the beam path 106. In some cases, two such switches may be serially positioned adjacent to one another along the beam path to increase the amount of the light which is deflected from the beam path when the switches are closed. For the Raman-Nath (AOM) switch, a fully-open to fully-closed switch time in the range of about 300-500 ns may be obtained for a 3-mm-diameter beam, and in some cases a close time of about 400 ns can be assumed for design purposes.

FIG. 11 also shows that the device 100 may include a beam delay 110 on the beam path 106 between the amplifier 112 and switch 108. As shown, the beam delay may have a beam folding optical arrangement including optics such as mirrors, prisms, etc., and establishing an optical delay distance, $d_{delay}$. Using an estimated light speed of about 3 E 08 meters per second, each meter of beam delay would add an additional 3.33 ns of travel time for light on the beam path 106. Suitable delay arrangements may be found in U.S. patent application Ser. No. 12/980,939, filed on Dec. 29, 2010, entitled MULTI-PASS OPTICAL APPARATUS, the entire contents of which are hereby incorporated by reference.

In one setup, the beam delay 110 is sized with a length to prevent light reflected from the target material at the irradiation site from reaching and damaging fragile optics in the oscillator 104 such as the output coupler, polarizer, rear mirror, grating, electro-optical modulation (EOM) switches, etc. For example, in one design, the beam delay 110 may be sized with a length such that the round trip time from the switch 108 to the irradiation site 116 and back, plus a suitable margin of safety, exceeds the close time of the switch 108. This round trip time can include twice the travel time from the switch 108 to the beam delay 110, twice the one-way travel time in the beam delay 110, twice the travel time from the beam delay 110 to the amplifier 112, twice the one way travel time in the amplifier 112, twice the travel time from the amplifier 112 to the conditioning unit 114, twice the one way travel time in the beam conditioning and focusing unit 114 and twice the travel time from the beam conditioning and focusing unit 114 to the irradiation site 116. Thus, for a switch 108 having a closing time in the range of about 300-500 ns, a round trip time of about 800-1000 ns may be appropriate.

In the operation of the device 100 shown in FIG. 11, a pulse of light is first emitted from the oscillator at t=0, having, for example, a pulse duration of about 100 ns. The trailing edge of the pulse exits the switch at about t=100 ns at which time switch 108 is activated to close. Assuming a 100 m pulse delay (333 ns) and a light travel time of about 150 ns from the pulse delay from the irradiation site 116, the leading edge of the pulse will reach the irradiation site 116 at about t=483 ns and trailing edge at about 583 ns. At t=500 ns, switch 108 having a close time of about 400 ns will be fully closed. Reflections from the droplet will reach closed switch 108 (leading edge at t=966 ns and trailing edge at t=1066) providing a factor of safety of about 466 ns.

Figure 12:
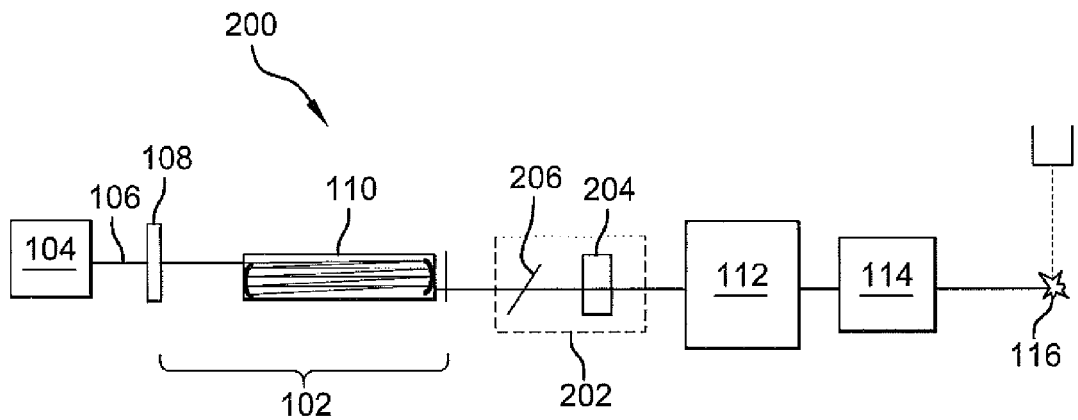
FIG. 12 shows another example of a device having a seed protection unit and an optical isolator.

FIG. 12 shows another example of a device 200 having a seed protection unit 102 and an optical isolator 202. As seen there, the device 200 may include an oscillator 104 producing a light output on beam path 106 which passes through switch 108, beam delay 110, amplifier 112, beam conditioning unit 114 and subsequently interacts with a target material at an irradiation site 116, all as previously described above with reference to FIG. 11. For the device 200, the oscillator 104 may include one or more polarizer(s) and/or Brewster's windows such that light exiting the oscillator 104 has a primary polarization direction. As shown, the optical isolator 202 may include phase retarding optic 204 such as a quarter wave assembly and polarizer 206 that is aligned parallel to the primary polarization direction of the oscillator. With this arrangement, light exiting the oscillator with the primary polarization direction will pass through the polarizer 206 and be altered by the phase retarding optic 204 (quarter wave assembly) exiting therefrom with circular polarization. This light will continue through the amplifier 112 and beam conditioner and focusing unit 114, reflect from the target material where an additional phase retardation due to plasma reflection will occur, pass back through the beam conditioner and focusing unit 114 and amplifier 112, where it will be incident on the phase retarding optic 204 (quarter wave assembly), in an elliptically polarized state. Upon passing through the phase retarding optic 204 (quarter wave assembly), the light will be altered again, exiting the phase-retarding optic 204 (quarter wave assembly) with a polarization state in which about 6-7% of the light leaks through the polarizer 206. At the polarizer 206, a substantial portion e.g., 92-3% of the light from the phase retarding optic 204 (quarter wave assembly) will be absorbed/reflected. Light which leaks through the polarizer 206, which may be substantial due to the large gain of the amplifier 112, e.g., 300-350 watts or more, will pass through the beam delay 110 and reach the closed switch 108.

Figure 13:
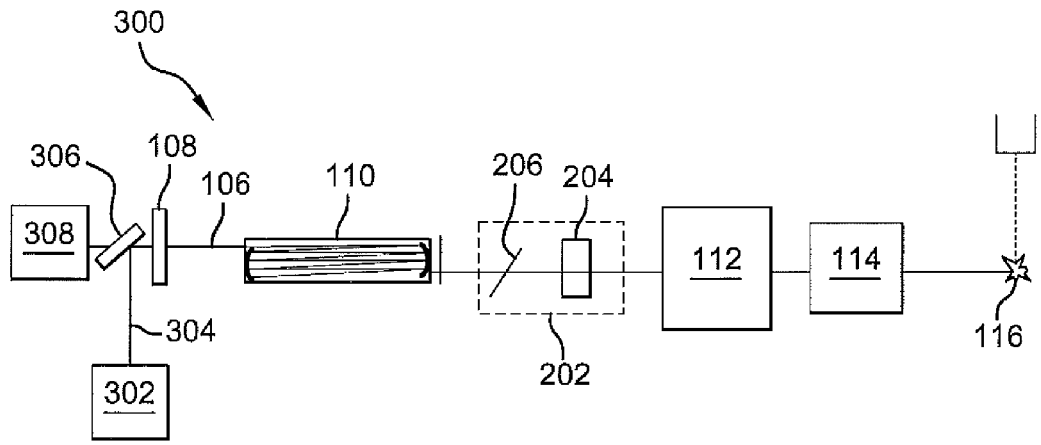
FIG. 13 shows an example of a device having a pre-pulse seed laser, main pulse seed laser and a seed protection unit.

FIG. 13 shows another example of a device 300 having a pre-pulse seed laser, main pulse seed laser and a seed protection unit. As shown there, the device 300 may include a pre-pulse seed laser 302 such as the seed laser shown in FIGS. 6, 7, 10 or some other suitable seed laser, producing a light output on beam path 304 that is incident on beam combiner 306 which directs the output on common beam path 106. For example, the beam combiner 306 may be a diffraction grating, dichroic beam combiner, prism, volume Bragg grating polarization discriminating beam combiner or partially reflecting beam combiner. Although the beam combiner 306 is shown reflecting the pre-pulse seed and transmitting the main pulse seed, it is to be appreciated that the beam combiner 306 could be arranged to reflect the main pulse seed and transmit the pre-pulse seed.

Once on common beam path 106, the pre-pulse seed output passes through switch 108, beam delay 110, amplifier 112, beam conditioning unit 114 and subsequently interacts with a target material at an irradiation site 116, all as previously described above with reference to FIG. 11. The device also includes main pulse seed laser 308, such as one of the seed lasers shown in FIGS. 6, 7, 10, or some other suitable seed laser, producing a light output that is incident on beam combiner 306 which directs the output onto common beam path 106. Once on common beam path 106, the main pulse seed output passes through switch 108, beam delay 110, amplifier 112, beam conditioning unit 114 and subsequently interacts with a target material at an irradiation site 116.

In one application of the device 300, switch 108 is initially opened allowing a laser pulse from the pre-pulse seed laser to pass through the switch and is thereafter closed to block "pre-pulse" reflections from the droplet. After a predetermined period that is related to the pre-pulse duration and the length of the path from the switch 108 to the droplet, the switch 108 can be opened to allow a laser pulse from the main pulse seed laser to pass through the switch and is thereafter closed to block "main pulse" reflections from the droplet. The process can then be repeated to irradiate another target material droplet.

Figure 14:
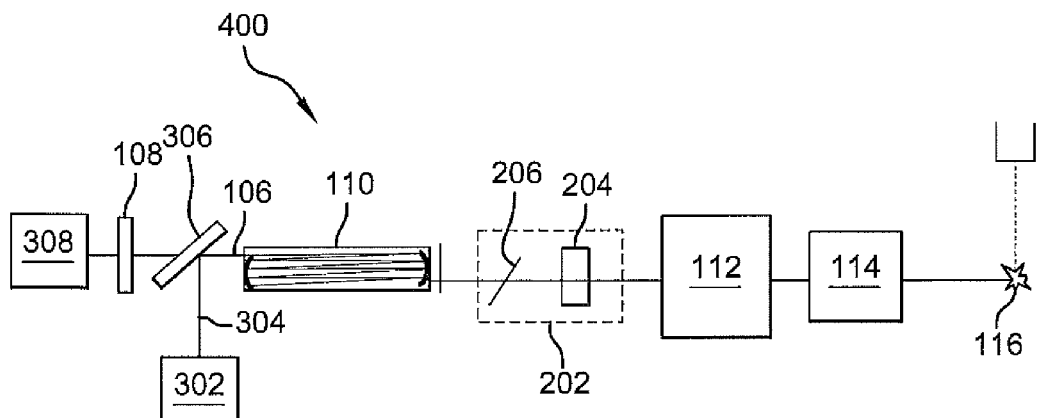
FIG. 14 shows another example of a device having a pre-pulse seed laser, main pulse seed laser and a seed protection unit.

FIG. 14 shows another example of a device 400 having a pre-pulse seed laser, main pulse seed laser and a seed protection unit. As shown there, the device 400 may include a pre-pulse seed laser 302 such as the seed laser shown in FIGS. 6, 7, 10 or some other suitable seed laser, producing a light output on beam path 304 that is incident on beam combiner 306 which directs the output on common beam path 106. For example, the beam combiner 306 may be a diffraction grating, dichroic beam combiner, prism, volume Bragg grating polarization discriminating beam combiner or partially reflecting beam combiner. Once on common beam path 106, the pre-pulse seed output passes through beam delay 110, amplifier 112, beam conditioning unit 114 and subsequently interacts with a target material at an irradiation site 116, all as previously described above with reference to FIG. 11. The device also includes main pulse seed laser 308 such as one of the seed lasers shown in FIGS. 6, 7, 10 or some other suitable seed laser, producing a light output that passes through switch 108 and is thereafter incident on beam combiner 306 which directs the output onto common beam path 106. Once on common beam path 106, the main pulse seed output passes through beam delay 110, amplifier 112, beam conditioning unit 114 and subsequently interacts with a target material at an irradiation site 116.

In one application of the device 400, switch 108 is initially closed. A laser pulse from the pre-pulse seed laser is generated and directed to the droplet. The switch 108 is closed to protect the main-pulse seed laser from "pre-pulse" reflections from the droplet. After a predetermined period that is related to the pre-pulse duration and the length of the path from the switch 108 to the droplet, the switch 108 can be opened to allow a laser pulse from the main pulse seed laser to pass through the switch and is thereafter closed to block "main pulse" reflections from the droplet. The process can then be repeated to irradiate another target material droplet.

Figure 15:
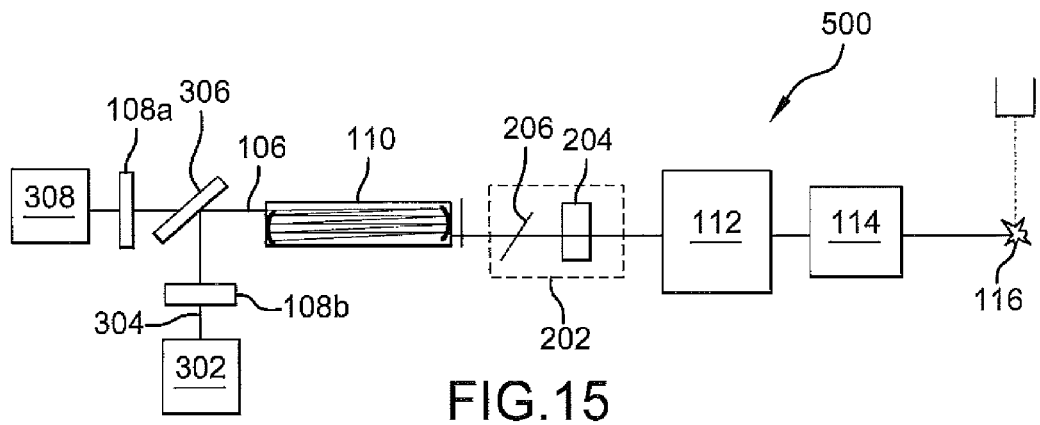
FIG. 15 shows another example of a device having a pre-pulse seed laser, main pulse seed laser and a seed protection unit.

FIG. 15 shows another example of a device 500 having a pre-pulse seed laser, main pulse seed laser and a seed protection unit. As shown there, the device 500 may include a pre-pulse seed laser 302 such as the seed laser shown in FIGS. 6, 7, 10 or some other suitable seed laser, producing a light output on beam path 304 that passes through switch 108b and is thereafter incident on beam combiner 306 which directs the output on common beam path 106. For example, the beam combiner 306 may be a diffraction grating, dichroic beam combiner, polarization discriminating beam combiner prism, volume Bragg grating or partially reflecting beam combiner. Once on common beam path 106, the pre-pulse seed output passes through beam delay 110, amplifier 112, beam conditioning unit 114 and subsequently interacts with a target material at an irradiation site 116, all as previously described above with reference to FIG. 11. The device also includes main pulse seed laser 308 such as one of the seed lasers shown in FIGS. 6, 7, 10 or some other suitable seed laser, producing a light output that passes through switch 108a and is thereafter incident on beam combiner 306 which directs the output onto common beam path 106. Once on common beam path 106, the main pulse seed output passes through beam delay 110, amplifier 112, beam conditioning unit 114 and subsequently interacts with a target material at an irradiation site 116.

In one application of the device 500, switch 108a is initially closed. A laser pulse from the pre-pulse seed laser is generated and passes through open switch 108b and is directed to the droplet. The switch 108b is then closed to protect the pre-pulse seed laser from both "pre-pulse" and "main pulse" reflections from the droplet. After a predetermined period that is related to the pre-pulse duration and the length of the path from the switch 108 to the droplet, the switch 108a can be opened to allow a laser pulse from the main pulse seed laser to pass through the switch, and is thereafter closed to block "main pulse" reflections from the droplet. The process can then be repeated to irradiate another target material droplet.

In some implementations, the switch 108a may be opened to pass a laser pulse from the main pulse while "pre-pulse" reflections are still reaching the beam combiner 306. For example, a desired delay between the pre-pulse and main pulse may be such that the switch 108a is open during pre-pulse reflections. For some cases, the beam combiner 306 may be a partial reflector reflecting greater than 50 percent and transmitting less that 50 percent of incident light. For example, if beam combiner 306 is a 90 percent reflector, then 90 percent of light which leaks through the optical isolator 202 would reach closed switch 108b and only about 10 percent would reach the main pulse seed laser. In one process, a delay of about 1000 ns between the pre-pulse and main pulse may be suitable, with a pre-pulse duration of about 100 ns and a main pulse duration of about 100 ns.

Figure 16:
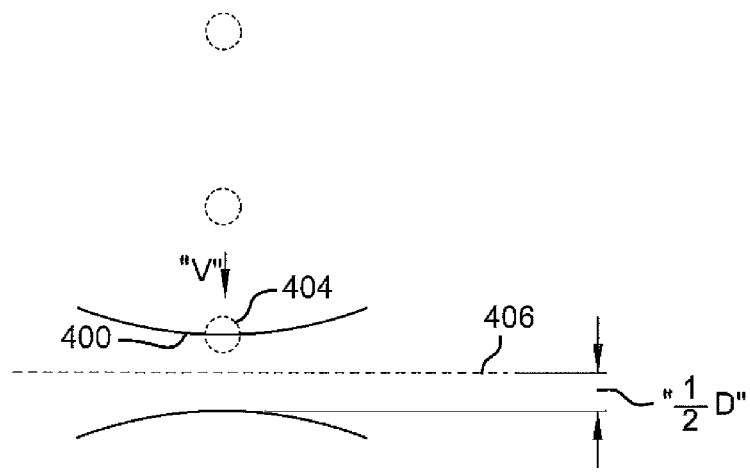
FIG. 16 shows a target material positioned halfway into a beam waist.

FIG. 16 shows a focused light beam waist 400 which may correspond to an oscillator-amplifier system without a pre-pulse seed such as the setup shown in FIG. 2A. FIG. 16 also shows a target material droplet 404 moving with a velocity, v, and positioned halfway into the beam waist 400 to illustrate the time that substantial reflections from the droplet 404 begin. Specifically, as shown, substantial reflections begin when the portion of the droplet 404 having a surface normal to the beam path 406 enters the beam waist 400. Stated another way, the reflectivity of the droplet 404 becomes substantial on the beam path through the amplifier 54, 54', 54", 112 (see e.g. FIGS. 2A, 2B, 3-5, and 11-15). Moreover, at this time, the droplet 404 reflectivity may be sufficient to establish an optical cavity through the amplifier with an optic, such as a seed laser output coupler, e.g. In addition, gains may exceed losses on the optical cavity defined by the droplet and optic, e.g., output coupler which depletes amplifier gain prior to seeding of the amplifier with a seed main pulse. With this in mind, Applicants disclose an arrangement in which the path length of the droplet-output coupler cavity is sized to prevent significant amplifier gain depletion prior to amplifier seeding by reducing the number of round-trips a photon can travel during a pre-seed interaction time.

More specifically, in one setup, for a target material droplet having a diameter in the range of about 25 to 40 μm traveling at a speed, v, for interaction with focused light having a beam waist diameter, D, on a beam path at an irradiation site, a pre-seed interaction time, T, in the waist, may be defined as T=D/2v. For this setup, a beam delay having a beam folding optical arrangement, such as beam delay 110 in FIGS. 11-15, may be sized such that the round trip travel time 2cl is greater than the pre-seed interaction time, T, in the waist (2cl>T) where, l, is the length along the path from the output coupler to the irradiation site and c is the speed of light on said path.

In more quantitative terms, a typical arrangement may include a target material droplet having a diameter, d, in the range of about 25 to 40 μm, a droplet speed, v, in the range of about 50 to 100 meters per second and the beam waist diameter, D in the range of about 80 to 120 μm. For an arrangement where v=65 m/s and D=100 μm, a length, l, greater than about 450 ns may be employed which may correspond to a beam delay length greater than about 70 meters and the remaining length including the amplifier of about 45 meters.

Figure 17:
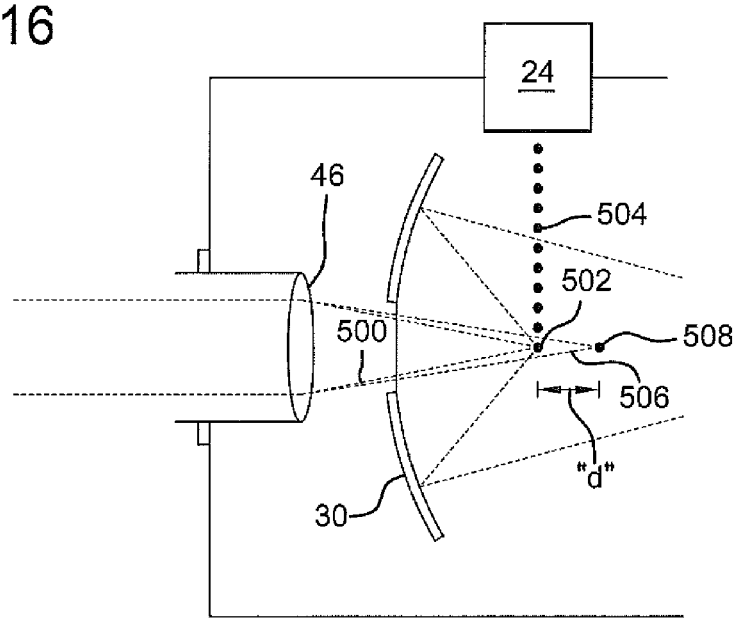
FIG. 17 shows a simplified sectional view of a portion of an EUV light source illustrating that pre-pulse and main pulse light having differing wavelengths will focus at different spots due to chromatic aberration of the focusing lens.

FIG. 17 shows a simplified sectional view of a portion of an EUV light source illustrating that pre-pulse and main pulse light having differing wavelengths will focus at different spots due to chromatic aberration of the focusing lens. In more detail, focusing optic 46 may include at least one lens or other element which introduces chromatic aberration. As shown in FIG. 11, chromatic aberration may cause pre-pulse light beam 500 having wavelength $\lambda_1$ to focus at location 502 along droplet path 504 while main pulse light beam 506 having wavelength $\lambda_2$ focuses at location 508 which is distanced from location 502 by "d".

Figure 18:
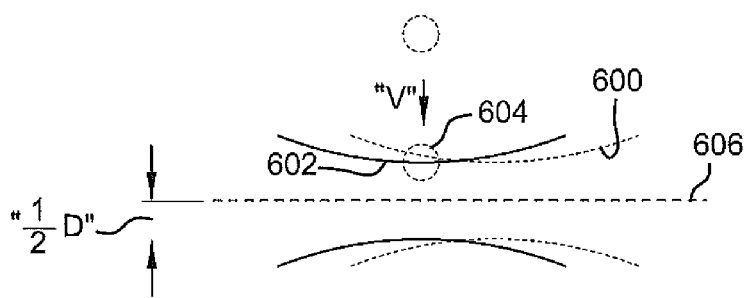
FIG. 18 shows a target material droplet positioned halfway into a pre-pulse beam waist.

FIG. 18 shows a pre-pulse beam waist 602 and main pulse beam waist 600, which, due to focusing optic chromatic aberration as described above, are spatially separated. FIG. 18 also shows a target material droplet 604 moving with a velocity, v, and positioned halfway into a pre-pulse beam waist 602 to illustrate the time that substantial reflections from the droplet 604 begin. Specifically, as shown, substantial reflections begin when the portion of the droplet 604 having a surface normal to the beam path 606 enters the main pulse beam waist 602. Stated another way, the reflectivity of the droplet 604 becomes substantial on the beam path through the amplifier 54, 54', 54", 112 (see e.g. FIGS. 2A, 2B, 3-5, and 11-15). Moreover, at this time, the droplet 604 reflectivity may be sufficient to establish an optical cavity through the amplifier with an optic, such as a seed laser output coupler, e.g., output coupler 72 shown in FIGS. 6, 7 and 10 (output coupler 92). In addition, gains may exceed losses on the optical cavity defined by the droplet and optic, e.g., oscillator output coupler which depletes amplifier gain prior to seeding of the amplifier with a pre-pulse seed and/or main pulse seed. With this in mind, Applicants disclose an arrangement in which the path length of the droplet-output coupler cavity is sized to prevent significant amplifier gain depletion prior to amplifier seeding by reducing the number of round-trips a photon can travel during a pre-seed interaction time.

More specifically, in one setup, for a target material droplet having a diameter in the range of about 25 to 40 μm traveling at a speed, v, for interaction with focused light having a pre-pulse beam waist diameter, D, on a beam path at an irradiation site, a pre-seed interaction time, T, in the waist, may be defined as T=D/2v. For this setup, a beam delay may have a beam folding optical arrangement, such as beam delay 100 in FIGS. 11-15, may be sized such that the round trip travel time 2cl is greater than the pre-seed interaction time, T, in the waist (2cl>T) where, l, is the length along the path from the output coupler to the irradiation site and c is the speed of light on said path.

In more quantitative terms, a typical arrangement may include a target material droplet having a diameter, d, in the range of about 25 to 40 μm, a droplet speed, v, in the range of about 50 to 100 meters per second and the pre-pulse beam waist diameter, D in the range of about 80 to 120 μm. For an arrangement where v=65 m/s and D=100 μm, a length, l, greater than about 450 ns may be employed which may correspond to a beam delay length greater than about 70 meters and the remaining length including the amplifier of about 45 meters.

While the particular embodiment(s) described and illustrated in this patent application in the detail required to satisfy 35 U.S.C. §112 are fully capable of attaining one or more of the above-described purposes for, problems to be solved by, or any other reasons for or objects of the embodiment(s) above described, it is to be understood by those skilled in the art that the above-described embodiment(s) are merely exemplary, illustrative and representative of the subject matter which is broadly contemplated by the present application. Reference to an element in the following Claims in the singular is not intended to mean nor shall it mean in interpreting such Claim element "one and only one" unless explicitly so stated, but rather "one or more". All structural and functional equivalents to any of the elements of the above-described embodiment(s) that are known or later come to be known to those of ordinary skill in the art are expressly incorporated herein by reference and are intended to be encompassed by the present Claims. Any term used in the Specification and/or in the Claims and expressly given a meaning in the Specification and/or Claims in the present Application shall have that meaning, regardless of any dictionary or other commonly used meaning for such a term. It is not intended or necessary for a device or method discussed in the Specification as an embodiment to address or solve each and every problem discussed in this Application, for it to be encompassed by the present Claims. No element, component, or method step in the present disclosure is intended to be dedicated to the public regardless of whether the element, component, or method step is explicitly recited in the Claims. No claim element in the appended Claims is to be construed under the provisions of 35 U.S.C. §112, sixth paragraph, unless the element is expressly recited using the phrase "means for" or, in the case of a method claim, the element is recited as a "step" instead of an "act".

We claim:

1. A device comprising:
an oscillator producing a light output on a beam path;
a target material for interaction with light on the beam path at an irradiation site;
a beam delay on said beam path the beam delay having a beam folding optical arrangement; and
a switch positioned along said beam path and interposed between said oscillator and said beam delay; the switch closable to divert at least a portion of light on said beam path from said beam path, said switch having close time, $t_1$ and said beam path having a length, $L_1$, along the path from the switch to the irradiation site; with $t_1 < cL_1$, where c is the speed of light on said path, to protect said oscillator.

2. A device as recited in claim 1 wherein the switch is an acousto-optic modulation (AOM) switch.

3. A device as recited in claim 1 further comprising an amplifier positioned on the beam path.

4. A device as recited in claim 1 wherein said switch has a close time, $t_1$, in the range of 300-500 ns.

5. A device as recited in claim 1 wherein said oscillator is a first oscillator generating a main pulse seed output and said device further comprises a second oscillator generating a pre-pulse seed output.

6. A device as recited in claim 1 wherein said beam delay has a length in the range of 80 to 120 meters.

7. A device as recited in claim 1 further comprising an optical isolator positioned on the beam path.

8. A device as recited in claim 7 wherein the optical isolator comprises a polarization discriminating optic and a phase retarding optic.

9. A device comprising:
an oscillator producing a light output on a beam path, the oscillator having an output coupler;
an amplifier positioned on the beam path;
a target material droplet traveling at a speed, v, for interaction with focused light having a beam waist diameter, D, on the beam path at an irradiation site, the droplet having a pre-seed interaction time, T, in the waist, with T=D/2v;
a beam delay on said beam path, the beam delay having a beam folding optical arrangement, said beam path having a length, l, along the path from the output coupler to the irradiation site; with 2cl>T, where c is the speed of light on said path, to reduce oscillation between said output coupler and said droplet.

10. A device recited in claim 9 wherein said droplet speed, v, is in the range of 50 to 100 meters per second and said beam waist diameter is in the range of 80 to 120 µm.

11. A device as recited in claim 9 further comprising an optical isolator positioned on the beam path.

12. A device as recited in claim 9 wherein said beam delay has a length in the range of 60 to 140 meters.

13. A device as recited in claim 9 further comprising a lens to focus light on said beam path to a waist having beam waist diameter, D.

14. A device as recited in claim 9 wherein said oscillator is a first oscillator generating a pre-pulse seed output and said device further comprises a second oscillator generating a main pulse seed output.

15. A device as recited in claim 14 wherein said amplifier has a one-pass, main pulse gain in the range of $1 \times 10^5$ to $1 \times 10^7$.

16. A device comprising:
an optical amplifier,
a pre-pulse seed laser,
a main pulse seed laser; and
a beam combiner for directing the pre-pulse output and the main pulse output on a common beam path through the optical amplifier;
a first switch interposed between the pre-pulse seed laser and the beam combiner; and
a second switch interposed between the main pulse seed laser and the beam combiner.

17. A device as recited in claim 16 wherein said first and second switches each comprise an acousto-optic modulation (AOM) switch.

18. A device as recited in claim 16 further comprising an optical isolator positioned on the beam path between the optical amplifier and beam combiner.

19. A device as recited in claim 16 wherein said beam combiner is a partially reflective optic.

20. A device as recited in claim 16 wherein said beam combiner comprises a dichroic beam combiner.

* * * * *